United States Patent
Walters et al.

(10) Patent No.: US 6,268,055 B1
(45) Date of Patent: Jul. 31, 2001

(54) PHOTOCHROMIC EPOXY RESIN COATING COMPOSITION AND ARTICLES HAVING SUCH A COATING

(75) Inventors: Robert W. Walters, Pittsburgh; Cletus N. Welch, Murrysville; John W. Burgman, Gibsonia; Debra L. Singer, Wexford; Shanti Swarup, Allison Park, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/187,698

(22) Filed: Nov. 6, 1998

Related U.S. Application Data

(60) Provisional application No. 60/067,868, filed on Dec. 8, 1997.

(51) Int. Cl.[7] .............................. C08G 59/42; B32B 27/38
(52) U.S. Cl. ........................ 428/413; 252/586; 528/112
(58) Field of Search ................................ 428/412, 413; 252/586; 528/112

(56) References Cited

U.S. PATENT DOCUMENTS

| | | | |
|---|---|---|---|
| 3,361,706 | 1/1968 | Meriwether et al. | 260/39 |
| 4,102,942 | 7/1978 | Smith et al. | 260/836 |
| 4,556,605 | 12/1985 | Mogami et al. | 428/331 |
| 4,681,811 | 7/1987 | Simpson et al. | 428/413 |
| 4,720,356 | 1/1988 | Chu | 252/586 |
| 4,756,973 | 7/1988 | Sakagami et al. | 428/412 |
| 4,764,430 | 8/1988 | Blackburn et al. | 428/413 |
| 4,931,220 | 6/1990 | Haynes et al. | 252/586 |
| 5,068,062 * | 11/1991 | Inata et al. | 252/518 |
| 5,196,485 * | 3/1993 | McMonigal et al. | 525/327.3 |
| 5,256,452 | 10/1993 | McMonigal et al. | 427/407.1 |
| 5,391,327 | 2/1995 | Ligas et al. | 252/586 |
| 5,395,566 | 3/1995 | Kobayakawa et al. | 252/586 |
| 5,462,698 | 10/1995 | Kobayakawa et al. | 252/586 |
| 5,541,151 * | 7/1996 | Sanchez | 502/160 |
| 5,621,017 | 4/1997 | Kobayakawa et al. | 522/16 |
| 5,645,767 | 7/1997 | Van Gemert | 252/586 |
| 5,658,501 | 8/1997 | Kumar et al. | 252/586 |
| 5,770,115 | 6/1998 | Misura | 252/586 |
| 5,961,892 * | 10/1999 | Gemert et al. | 252/586 |
| 6,060,001 * | 5/2000 | Welch et al. | 252/586 |
| 6,068,797 * | 5/2000 | Hunt | 264/1.7 |
| 6,187,444 | 2/2001 | Bowles, III et al. | 428/423.1 |

FOREIGN PATENT DOCUMENTS

| | | |
|---|---|---|
| 289 444 | 2/1986 | (DE) . |
| 0 212457 | 3/1987 | (EP) . |
| 1 419 985 | 1/1976 | (GB) . |
| WO98/37115 | 8/1998 | (WO) . |

OTHER PUBLICATIONS

"Dithiocarbamic Acid to Ethanol", *Ullmann's Encyclopedia of Industrial Chemistry*, Fifth, Completely Revised Edition, 1987, vol. A9, pp. 547–563.

J.C. Crano, "Chromogenic Materials", *Kirk–Othmer Encyclopedia of Chemical Technology*, 4th. Ed., vol. No. 6, pp. 321–332, 1993.

C. D. Eisenbach, "New Aspects of Photochromism in Bulk Polymers", Society of Photographic Scientists and Engineers, 1979.

H. Lee, K. Neville, *Handbook of Epoxy Resins*, 1967, McGraw–Hill, Inc., Chapter 16, "Flexibilizers and Plasticizers for Epoxy Resins", pp. 16–1 to 16–32.

* cited by examiner

*Primary Examiner*—H. Thi Le
(74) *Attorney, Agent, or Firm*—Frank P. Mallak

(57) ABSTRACT

Described are photochromic epoxy resin coatings that meet commercially acceptable "cosmetic" standards for optical coatings. Also described are articles having such coatings. The coatings exhibit a Fischer microhardness of from 50 to 150 Newtons per $mm^2$ and desirable photochromic properties, i.e., the formation of darker activated colors and faster rates of photochromic activation and fade when irradiated with ultraviolet light.

27 Claims, No Drawings

PHOTOCHROMIC EPOXY RESIN COATING COMPOSITION AND ARTICLES HAVING SUCH A COATING

CROSS REFERENCE TO RELATED APPLICATIONS

This application claims priority to provisional application Ser. No. 60/067,868 filed Dec. 8, 1997, which Application is incorporated herein by reference.

DESCRIPTION OF THE INVENTION

The present invention relates to photochromic epoxy resin coatings and articles coated with such coatings. More particularly, this invention relates to certain photochromic epoxy resin coatings prepared with polyacid curing agents which when coated onto a substrate and exposed to activating light radiation exhibit improved photochromic performance properties. Further, this invention relates to photochromic epoxy resin coatings that meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The general mechanism responsible for the reversible change in color, i.e., a change in the absorption spectrum in the visible range of light (400–700 nm), exhibited by different types of photochromic compounds has been described and categorized. See John C. Crano, "Chromogenic Materials (Photochromic)", *Kirk-Othmer Encyclopedia of Chemical Technology*, Fourth Edition, 1993, pp. 321–332. The mechanism for the reversible change in color for indolino spiropyrans and indolino spirooxazines is believed to involve an electrocyclic mechanism. When exposed to activating radiation, these compounds transform from a colorless closed ring compound into a colored open ring species. In contrast, the colored form of fulgide photochromic compounds is believed to be produced by an electrocyclic mechanism involving the transformation of a colorless open ring form into a colored closed ring form.

In the aforedescribed electrocyclic mechanisms, the described photochromic compounds require an environment in which they can reversibly transform. In solid polymer matrices, the rates at which the photochromic processes of activation, i.e., formation of color or darkening, and fading, i.e., the return to the original or colorless state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183–190. One of the main obstacles reported by Claus D. Eisenbach, for the larger commercial application of photochromic systems, is the slow rate of photochromic activation and fade in a solid polymer matrix.

UK Patent No. 1,419,985 describes a sunlight photochromic filter for human spectacles prepared from an epoxy resin containing photochromic material. The photochromic epoxy resin is free of molecular oxygen and protected from atmospheric oxygen by an oxygen-impermeable barrier. U.S. Pat. No. 4,556,605 describes photochromic coating compositions comprising spiropyrans, hydrolysates of organosilanes, an epoxy compound and curing catalyst. U.S. Pat. No. 4,756,973 describes a plastic lens having an epoxy resin layer containing a spirooxazine along with a phenol resin and/or a phenolic compound. However, articles coated with a photochromic epoxy resin coating that have coating thicknesses necessary to demonstrate good photochromic properties, i.e., to color and fade at acceptable rates and to achieve a dark enough colored state, and that meet optical coating "cosmetic" standards required by the industry and the consuming public are currently not commercially available.

In accordance with the present invention, there has now been developed novel photochromic epoxy resin coatings that have acceptable Fischer microhardness and photochromic properties. These novel coatings exhibit a Fischer microhardness of from 50 to 150 Newtons per $mm^2$, and improved photochromic properties, i.e., the formation of darker activated colors and faster rates of photochromic activation and fade when irradiated with ultraviolet light.

DETAILED DESCRIPTION OF THE INVENTION

In recent years, photochromic articles, particularly photochromic plastic materials for optical applications, have been the subject of considerable attention. In particular, photochromic ophthalmic plastic lenses have been investigated because of the weight advantage they offer, vis-à-vis, glass lenses. Moreover, photochromic transparencies for vehicles, such as cars and airplanes, have been of interest because of the potential safety features that such transparencies offer. Photochromic articles that are most useful are those in which the photochromic compounds exhibit a high activated intensity, a high coloration rate and an acceptable fade rate.

The use of photochromic epoxy resin coatings enables the preparation of photochromic plastic articles without the need to incorporate the photochromic compound(s) into the plastic substrate, which avoids the need to develop special organic optical resin materials for use with photochromic compounds. This is advantageous when the plastic, e.g., thermoplastic polycarbonate, does not have enough internal free volume for the photochromic compounds to function properly. Coating such plastics with the coating composition of the present invention enables preparation of photochromic articles using these plastics. Another advantage that a photochromic coating provides is the more efficient utilization of photochromic compounds when preparing photochromic articles, i.e., avoiding the loss of photochromic compounds associated with more conventional transfer methods of incorporating such materials into plastics, e.g., imbibition or permeation.

Other than in the operating examples, or where otherwise indicated, all values, such as those expressing wavelengths, quantities of ingredients, ranges or reaction conditions, used in this description and the accompanying claims are to be understood as modified in all instances by the term "about".

The photochromic coatings of the present invention may be prepared by the reaction of a composition comprising an epoxy resin and a curing agent, e.g., a polyacid comprising a half-ester formed from reacting an acid anhydride with an organic polyol, wherein the composition includes at least one organic photochromic substance. The coating composition may further include a catalyst. Regarding other possible conventional ingredients or adjuvants in the coating composition, it is known in the coating art that solvents are typically used to dissolve certain of the ingredients in the coating composition, act as carriers and/or adjust the viscosity of the coating composition for different application methods. Therefore while solvents may be present in the coating composition described herein, they are not factored into the weight ratios and weight percents stated herein. All weight ratios and weight percents used herein are based on the total solids in the coating composition, unless stated otherwise.

When the coating composition of the present invention is applied as a coating and cured, it exhibits a Fischer microhardness in the range of from 50 to 150 Newtons per $mm^2$ and improved photochromic performance properties. The improved photochromic performance properties contemplated herein are a $\Delta OD$ of at least 0.15 after 30 seconds and at least 0.50 after 15 minutes, and a Bleach rate of less than 200 seconds—all as measured at 72° F. (22° C.) , and as described in Part C of Example 9 herein. Preferably, the Fischer microhardness is between 60 and 140 Newtons per $mm^2$, the $\Delta OD$ is at least 0.17 after 30 seconds and at least 0.60 after 15 minutes, and the Bleach rate is less than 190 seconds. Most preferably, the Fischer microhardness is in the range of from 80 to 130 Newtons per $mm^2$, the $\Delta OD$ is at least 0.18 after 30 seconds and at least 0.63 after 15 minutes, and the Bleach rate is less than 180 seconds.

Epoxy resin coatings having a microhardness within the aforestated ranges can be produced by balancing the components that contribute to the hardness and softness of the polymeric matrix. Polymeric matrices of cured epoxy resins may be composed of hard and soft segments connected through various types of linkages. See "Flexibilizers and Plasticizers for Epoxy Resins", *Handbook of Epoxy Resins*, Henry Lee and Kris Neville, McGraw-Hill Publishers, 1967, pages 16-1 to 16-32.

Other properties of epoxy resins that effect the hardness or softness of the polymeric matrix are the glass transition temperature and molecular weight. An increase in either property results in a harder resin and vice versa. The softness or flexibility of an epoxy resin is also effected by its cross-link density, i.e., the number of effective cross-links per unit volume. For example, in the diglycidyl ether of bisphenol A (DGEBA), the epoxy groups are separated by seven units (the aromatic ring being counted as one unit). In general, it has been reported that short spacings (3 to 10 units) give rigidity, medium spacings (10 to 30 units) give semi-rigid properties, and long spacing (30 or more units) gives flexibility or softness.

Similarly, curing agents may be selected for their contribution to the hardness and/or softness of the resulting cured coating. For example, a curing agent that increases hardness is the reaction product of an acid anhydride and a short chain polyol, e.g., low molecular weight polyols (as defined hereinafter), while a curing agent that increases softness is the reaction product of an acid anhydride and a long chain polyol, such as a polyester polyol or polyether polyol. In addition to the aforedescribed polyols, other polyols, described hereinafter, may be used to modify the hardness or softness of the polyacid curing agent.

The contribution of a particular component, e.g., an organic polyol, to either the hardness or softness of the resin can be readily determined by measuring the Fischer microhardness of the resulting epoxy resin coating. The hardness-producing component of the epoxy resin coating composition, as defined herein, is a component that increases the microhardness of the resulting coating with increases in its concentration, vis-à-vis, the softness-producing component. Similarly, the softness-producing component of the epoxy resin coating composition, as defined herein, is a component that decreases the microhardness of the resulting coating with increases in its concentration, vis-à-vis, the hardness-producing component. Examples of hardness-producing organic polyols include, but are not limited to, low molecular weight polyols, amide-containing polyols, polyacrylic polyols, epoxy polyols and urethane polyols. The softness-producing organic polyols include, but are not limited to, polyester polyols and polyether polyols, e.g. polyoxyalkylenes and poly (oxytetramethylene)diols. All of the aforementioned polyols are defined hereinafter.

The physical properties of epoxy resin polymeric matrices are derived from their molecular structure and are determined by the choice of building blocks, e.g., the choice of the reactants, the ratio of the hardness and softness-producing components, and the supra-molecular structures caused by atomic interactions between chains. Materials and methods for the preparation of epoxy resins are described in *Ullmann's Encyclopedia of Industrial Chemistry*, Fifth Edition, 1992, Vol. A9, pages 547 to 563, which description is herein incorporated by reference. In accordance with the present invention, it has been discovered that by balancing the building blocks of the photochromic epoxy resin coating, a coating having a Fischer microhardness in the range of from 50 to 150 Newtons/$mm^2$ that also exhibits good photochromic response characteristics can be achieved.

Epoxy resins or polyepoxides that may be used to produce the coating composition of the present invention include epoxy resins that when combined with curing agents and photochromic compound(s) produce a cured coating that demonstrates the requisite Fischer microhardness levels and photochromic response characteristics described herein. Among the polyepoxides which can be used are epoxy-containing acrylic polymers, epoxy condensation polymers such as polyglycidyl ethers of alcohols and phenols and polyglycidyl esters of polycarboxylic acids, certain polyepoxide monomers and oligomers and mixtures of such polyepoxides. Examples of these materials are described in U.S. Pat. No. 5,256,452 column 3, line 28 to column 4, line 46, which disclosure is incorporated herein by reference. The preferred polyepoxide is the epoxy-containing acrylic polymer.

Specific examples of epoxy condensation polymers include polyglycidyl esters resulting from the reaction of polycarboxylic acids with an epihalohydrin such as epichlorohydrin. The polycarboxylic acid may be formed by any method known in the art and in particular, by the reaction of aliphatic alcohols, diols or polyols with an anhydride. For example, trimethylol propane or pentaerythritol can be reacted with hexahydrophthalic anhydride to produce a polycarboxylic acid which is then reacted with epichlorohydrin to produce a polyglycidyl ester.

Further examples of such polyepoxides are polyglycidyl ethers of polyhydric phenols and of aliphatic alcohols. The polyepoxides may be produced by the etherification of the polyhydric phenol or aliphatic alcohol with an epihalohydrin such as epichlorohydrin in the presence of alkali. Examples of suitable polyphenols are 2,2-bis(4 -hydroxyphenyl) propane (bisphenol A) and 1,1-bis(4-hydroxyphenyl)ethane. Examples of suitable aliphatic alcohols include ethylene glycol, diethylene glycol, pentaerythritol, trimethylol propane, 1,2-propylene glycol and 1,4-butylene glycol. Also, cycloaliphatic polyols such as 1,2-cyclohexanediol, 1,4-cyclohexanediol, 1,4-cyclohexane dimethanol, 1,2-bis (hydroxymethyl)cyclohexane and hydrogenated bisphenol A may be used.

In addition to the aforedescribed epoxy-containing polymers, certain low molecular weight polyepoxide monomers and oligomers may also be used. Examples of these materials are described in U.S. Pat. No. 4,102,942 in column 3, lines 1–16, which disclosure is incorporated by reference. Specific examples of such low molecular weight polyepoxides are 3,4-epoxycyclohexylmethyl-3,4-epoxycyclohexanecarboxylate and bis(3,4-epoxycyclohexylmethyl)adipate. These materials are aliphatic polyepoxides as are the epoxy-containing acrylic polymers. Other materials that may be used in place of or in combination with the previously mentioned polyepoxides include the reaction products of glycidol with isocyanates such as m-isopropenyl-α,α-dimethylbenzyl isocyanate, di-functional isocyanates, tri-functional isocyanates, and mixtures of these reaction products.

The epoxy-containing acrylic polymer is a copolymer of an ethylenically unsaturated monomer having acrylic functionality and at least one epoxy group, and at least one polymerizable ethylenically unsaturated monomer which is free of epoxy groups. Ethylenically unsaturated monomers containing epoxy groups suitable for use are those containing 1,2-epoxy groups and include glycidyl acrylate, glycidyl methacrylate, 3,4-epoxycyclohexylmethyl (meth)acrylate; 2-(3,4-epoxycyclohexyl)ethyl (meth)acrylate and allyl glycidyl ether.

Ethylenically unsaturated monomers which do not contain epoxy groups can be any such monomers known to those skilled in the art that can react by free radical addition polymerization with epoxy-containing unsaturated monomers to form a copolymer with epoxy functionality. Non-exclusive examples of such ethylenically unsaturated monomers which do not contain epoxy groups are alkyl esters of acrylic and methacrylic acid containing from 1 to 20 atoms in the alkyl group. Specific examples of these acrylates and methacrylates include: ethyl acrylate, butyl acrylate, 2-ethylhexyl acrylate, cyclohexyl acrylate, benzyl acrylate, isobornyl acrylate, methyl methacrylate, ethyl methacrylate, butyl methacrylate, isobornyl methacrylate, isodecyl methacrylate, cyclohexyl methacrylate, benzyl methacrylate, and mixtures thereof.

Examples of other copolymerizable ethylenically unsaturated monomers free of epoxy groups are vinyl aromatic compounds such as styrene and vinyl toluene, nitriles such as acrylonitrile and methacrylonitrile; vinyl and vinylidene halides such as vinyl chloride and vinylidene fluoride and vinyl esters such as vinyl acetate, vinyl propionate, and vinyl pivalate; and hydroxyl functional free radical polymerizable monomers like hydroxyethyl methacrylate, hydroxyethyl acrylate, hydroxypropyl methacrylate, hydroxypropyl acrylate, hydroxybutyl methacrylate, and hydroxybutyl acrylate.

The epoxy-containing ethylenically unsaturated acrylic monomer may be used in amounts of from 10 to 90 percent by weight, preferably 30 to 80 percent by weight, more preferably from 40 to 70 percent by weight, and most preferably from 50 to 65 percent by weight, of the total weight of monomers used in preparing the epoxy-containing acrylic copolymer, i.e., the polymerizable composition. The non-epoxy containing ethylenically unsaturated monomer represents from 10 to 90 percent by weight, preferably from 20 to 70 percent by weight, more preferably from 30 to 60 percent by weight, and most preferably, from 35 to 50 percent by weight of the polymerizable composition. The total weight percent of the monomers used to prepare the epoxy-containing acrylic copolymer should equal 100 percent.

The epoxy-containing acrylic copolymer may be prepared by free radical initiated polymerization techniques, such as solution or emulsion polymerization which is known to those skilled in the art; but, preferably is prepared by solution polymerization techniques in the presence of suitable catalysts such as organic peroxides. Examples of such catalysts include di-t-amyl peroxide, t-butyl perbenzoate, t-amyl peracetate, t-butyl peracetate or ethyl-3,3-di(t-amylperoxy)butyrate or azo compounds, such as benzoyl peroxide, N,N'-azobis(isobutyronitrile) or alpha, alpha-dimethylazobis(isobutyronitrile). Other free radical polymerization methods and other catalysts or initiators known to those skilled in the art for preparing epoxy monomers may also be used. The polymerization may be carried out in an organic solution in which the monomers are soluble, as is known to those skilled in the art. Suitable solvents are aromatic solvents such as xylene, toluene and mixtures thereof, ketones such as methyl amyl ketone or ester solvents such as ethyl 3-ethoxypropionate. Other materials also may be present during the polymerization. For example, a chain transfer agent such as alpha-methyl styrene dimer is preferably present in conventional chain transfer amounts. The polymerization process and additional examples of both ethylenically unsaturated monomers with and without epoxy functionality is disclosed in U.S. Pat. No. 4,681,811, which disclosure is incorporated herein by reference.

The epoxy copolymers can have a range of molecular weights and a range of glass transition temperatures (Tg). For example, the weight average molecular weight of the epoxy copolymer can be greater than or equal to 1,000, e.g., from 1,000 to 100,000, preferably from 2,000 to 60,000, more preferably from 2,500 to 20,000, and most preferably from 3,000 to 10,000, e.g., from 4,000 to 6,000. The molecular weight is determined by gel permeation chromatography using a polystyrene standard. Preferably, the epoxy copolymers for liquid coatings have a calculated glass transition temperature (Tg) less than 50° C., more preferably less than 30° C. Glass transition temperature is described in *PRINCIPLES OF POLYMER CHEMISTRY*, Flory, Cornell University Press, Ithaca, N.Y., 1953, pages 52–57. The Tg can be calculated as described by Fox in Bull. Amer. Physic. Society, 1,3, page 123 (1956). The Tg can be measured experimentally by using a penetrometer such as a Du Pont 940 Thermomedian Analyzer.

The epoxy copolymers, i.e., polyepoxides, are typically present in the coating composition in amounts of from 10 to 90 percent by weight, preferably from 20 to 80 percent, more preferably from 40 to 60 percent and most preferably from 45 to 55 percent by weight, based on the total weight of polymerizable solids in the coating composition.

The coating composition of the present invention also includes a polyacid curing agent having a high average acid functionality. More specifically, the polyacid curing agent of the present invention on average contains two or more acid groups per molecule, such acid groups being reactive with the polyepoxide to form a cured or crosslinked coating as indicated by its resistance to organic solvent. The parameter of two or more acid groups per molecule is intended to encompass polyacid curing agents that are di-functional, tri-functional, tetra-functional, curing agents having higher functionality and/or mixtures thereof. Polyacid curing agent mixtures including up to 70 weight percent, based on the total weight of curing agent, of a di-functional curing agent and hte remainder being a higher-functional curing agent may be used. Preferred are polyacid curing agent mixtures that include up to 50 weight percent of di-functional curing agents, more preferably, up to 35 weight percent of di-functional curing agents, and most preferably, up to 25 weight percent of di-functional curing agents, the remainder being higher functional curing agents. An example of a curing agent mixture is one containing from 10 to 25 weight percent of di-functional curing agents and from 75 to 90 weight percent of tetrafunctional curing agents.

The acid functionality of the polyacid curing agent is preferably carboxylic acid, although acids such as phosphorus-based acid may be used. Preferably, the polyacid curing agent is a carboxylic acid terminated material having, on average, two or more carboxylic acid groups per molecule. Examples of polycarboxylic acids include dicarboxylic acids such as oxalic, malonic, succinic, tartaric, glutaric, adipic, sebacic, maleic, fumaric, phthalic, isophthalic, terephthalic, dodecanedioic acids and dimerized fatty acids; tricarboxylic acids such as citric, tricarballylic, and trimellitic acids; tetracarboxylic acids such as 1,2,3,4-butanetetracarboxylic acid and the polycarboxylic acids not specified above that are listed hereinafter as materials used in preparing polyesters.

Among the polyacid curing agents which may be used are carboxylic acid group-containing polymers such as acrylic polymers, polyesters, and polyurethanes; oligomers such as ester group-containing oligomers and monomers. The polyacid curing agent is present in the coating composition in amounts of from 10 to 90 percent by weight, preferably from 20 to 80 percent, more preferably from 40 to 60 percent and most preferably from 45 to 55 percent by weight based on total weight of the polymerizable solids in the coating composition.

The preferred polyacid curing agents are ester group-containing oligomers. Examples include half-esters formed from reacting polyols and cyclic 1,2-acid anhydrides or acid functional polyesters derived from polyols and polyacids or anhydrides. The half-ester is obtained by reaction between a polyol and a cyclic 1,2-acid anhydride under conditions sufficient to open the anhydride ring forming the half-ester with substantially no polyesterification occurring. By substantially no polyesterification occurring means that the carboxyl groups formed by the reaction of the anhydride are not further esterified by the polyol in a recurring manner. By this it is meant that less than 10, preferably less than 5 percent by weight polyester is formed.

Two reactions may occur in combining the anhydride and the polyol together under suitable reaction conditions. The desired reaction mode involves ring opening the anhydride ring with hydroxyl, i.e.,

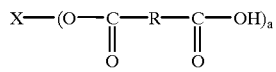

wherein X is the residue of the polyol after the polyol has been reacted with two or more 1,2-dicarboxylic acid anhydrides, R is an organic moiety associated with the anhydride and a is equal to or greater than 2.

Subsequently, carboxylic acid groups formed by the opening of the anhydride ring may react with hydroxyl groups to give off water via a condensation reaction. Although this latter reaction can be used, it is not preferred since it can lead to a polycondensation reaction resulting in polyester products with higher molecular weights and lower cross link density.

To achieve the desired reaction, the 1,2-acid anhydride and polyol are usually mixed together in a reaction vessel. Preferably, the reaction is conducted in the presence of an inert atmosphere such as nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, and methyl isobutyl ketone; aromatic hydrocarbons such as toluene and xylene; as well as other organic solvents such as dimethyl formamide, n-amyl propionate, ethyl benzene, propylene glycol monomethylether acetate, ethyl 3-ethoxypropionate and n-methyl-pyrrolidone.

For the desired ring opening reaction and half-ester formation, a 1,2-dicarboxylic anhydride is used. Reaction of a polyol with a carboxylic acid instead of an anhydride would require esterification by condensation and elimination of water which would have to be removed by distillation. Under these conditions this would promote undesired polyesterification. Also, the reaction temperature is preferably low, that is, no greater than 135° C., preferably less than 120° C., and usually within the range of 70°–135° C., preferably 90°–125° C. Temperatures greater than 135° C. are generally undesirable because they promote polyesterification, whereas temperatures less than 70° C. are undesirable because of sluggish reaction rates. The time of reaction can vary somewhat depending principally upon the temperature of reaction. Usually the reaction time will be from as low as 10 minutes to as high as 24 hours.

The equivalent ratio of anhydride to hydroxyl on the polyol is preferably at least about 0.8:1 (the anhydride being considered monofunctional) to obtain maximum conversion to the desired half-ester. Ratios less than 0.8:1 can be used but such ratios result in increased formation of lower functionality half-esters.

Among the anhydrides which can be used to prepare the desired polyacid curing agents are those which, exclusive of the carbon atoms in the anhydride moiety, i.e.,—C(O)O(O)C—, contain from about 2 to 30 carbon atoms. Examples include aliphatic, including cycloaliphatic, olefinic and cycloolefinic anhydrides and aromatic anhydrides. Substituted anhydrides are also included within the definition of aliphatic and aromatic provided the substituents do not adversely affect the reactivity of the anhydride or the properties of the resultant polyacid curing agent. Examples of substituents would be chloro, alkyl, and alkoxy. Examples of anhydrides include succinic anhydride, methylsuccinic anhydride, dodecenyl succinic anhydride, glutaric anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

The composition may optionally contain an aliphatic monocarboxylic acid containing at least 6, preferably from 8 to 22 carbon atoms such as described in U.S. Pat. No. 4,764,430, column 6, line 48, to column 7, line 9, which disclosure is incorporated herein by reference. Examples of such acids include lauric acid and isostearic acid, which is preferred. These monocarboxylic acids, when used, are present in amounts up to 15 percent, preferably 0.5 to 10 percent by weight based on total weight of the coating composition.

The equivalent ratio of the reactants present in the coating composition is adjusted such that for each equivalent of carboxyl (anhydride, if present is considered monofunctional) there is from 0.3 to 3.0, preferably from 0.5 to 2.0 and more preferably from 0.8 to 1.5 equivalent of epoxy resin.

The coating compositions may also contain catalysts to accelerate the reaction of the carboxyl and the epoxy groups. Examples of suitable catalysts are basic materials and include organic amine catalysts such as piperidine, diethylenetriamine, triethylamine, N,N-dimethyldodecylamine, pyridine, 1,4-diazabicyclo[2.2.2] octane and N,N-dimethylaniline; ammonium compounds including tetramethylammonium halides, e.g., tetramethylammonium chloride and tetramethylammonium iodide, tetramethylammonium acetate, tetramethylbenzylammonium acetate, tetrabutylammonium halides, e.g., tetrabutylammonium fluoride and tetrabutylammonium hydroxide; phosphonium compounds, including ethyltriphenylphosphonium acetate and tetrabutylphosphonium halides, e.g., tetrabutylphosphonium bromide; other ammonium and phosphonium salts; organotin catalysts such as tin octoate, dibutyltin diacetate, dibutyltin dilaurate, dibutyltin mercaptide, dibutyltin dimaleate, dimethyltin diacetate, dimethyltin dilaurate, dimethyltin mercaptide, dimethyltin dimaleate, triphenyltin acetate, triphenyltin hydroxide; and mixtures thereof. The amount of catalyst is a catalytic amount, i.e., the amount necessary to accelerate the reaction of the epoxy resin and curing agent. Typically this amount is from 0.01 to 10, preferably from 0.1 to 3 percent by weight based on the weight of the polyepoxide.

The organic polyols, i.e., diol, triol, etc., used to prepare the polyacid curing agents of the present invention include (a) low molecular weight polyols, i.e., polyols having a weight average molecular weight less than 500, e.g., aliphatic diols, such as $C_2$–$C_{10}$ aliphatic diols, triols and polyhydric alcohols; (b) polyester polyols; (c) polyether polyols; (d) amide-containing polyols; (e) polyacrylic polyols; (f) polyhydric polyvinyl alcohols; (g) epoxy polyols; (h) urethane polyols; and (i) mixtures of such polyols. Preferably, the organic polyols are selected from the group consisting of low molecular weight polyols, polyacrylic polyols, polyether polyols, polyester polyols and mixtures thereof. More preferably, the organic polyols are selected from the group consisting of low molecular weight polyols, polyester polyols, polyether polyols, and mixtures thereof, and most preferably low molecular weight polyols, polyether polyols and mixtures thereof.

Examples of low molecular weight polyols that can be used to prepare the polyacid curing agents used in the coating composition of the present invention include: tetramethylolmethane, i.e., pentaerythritol; trimethylolethane; trimethylolpropane; di-(trimethylolpropane); dimethylolpropionic acid; 1,2-ethanediol, i.e., ethylene glycol; 1,2-propanediol, i.e., propylene glycol; 1,3-propanediol; 2,2-dimethyl-1,3-propanediol, i.e., neopentyl glycol; 1,2,3-propanetriol, i.e., glycerin; 1,2-butanediol; 1,4-butanediol; 1,3-butanediol; 1,2,4-butanetriol; 1,2,3,4-butanetetrol; 2,2,4-trimethyl-1,3-pentanediol; 1,5-pentanediol; 2,4-pentanediol; 1,6-hexanediol; 2,5-hexanediol; 1,2,6-hexanetriol; 2-methyl-1,3-pentanediol; 2,4-heptanediol; 2-ethyl-1,3-hexanediol; 1,4-cyclohexanediol; 1-(2,2-dimethyl-3-hydroxypropyl)-2,2-dimethyl-3-hydroxypropionate; hexahydric alcohol, i.e., sorbitol; diethylene glycol; dipropylene glycol; 1,4-cyclohexanedimethanol; 1,2-bis(hydroxymethyl) cyclohexane; 1,2-bis(hydroxyethyl)-cyclohexane; bishydroxypropyl hydantoins; TMP/epsilon-caprolactone triols; hydrogenated bisphenol A; tris hydroxyethyl isocyanurate; the alkoxylation product of 1 mole of 2,2-bis(4-hydroxyphenyl)propane (i.e., bisphenol-A) and 2 moles of propylene oxide; ethoxylated or propoxylated trimethylolpropane or pentaerythritol having a number average molecular weight less than 500, and mixtures of such low molecular weight polyols.

Polyester polyols are generally known and can have a number average molecular weight in the range of from 500 to 10,000. They are prepared by conventional techniques utilizing low molecular weight diols, triols and polyhydric alcohols known in the art, including but not limited to the previously described low molecular weight polyols (optionally in combination with monohydric alcohols) with polycarboxylic acids.

Examples of suitable polycarboxylic acids for use in preparing the polyester include: phthalic acid, isophthalic acid, terephthalic acid, tetrahydrophthalic acid, tetrachlorophthalic acid, hexahydrophthalic acid, methylhexahydrophthalic acid, adipic acid, azelaic acid, sebacic acid, maleic acid, succinic acid, glutaric acid, fumaric acid, chlorendic acid, trimellitic acid, tricarballylic acid and mixtures thereof. Anhydrides of the above acids, where they exist, can also be employed. In addition, certain materials which react in a manner similar to acids to form polyester polyols are also useful. Such materials include lactones, e.g., caprolactones, propiolactone and butyrolactone, and hydroxy acids such as hydroxycaproic acid and dimethylol propionic acid. If a triol or polyhydric alcohol is used, a monocarboxylic acid, such as acetic acid and/or benzoic acid, may be used in the preparation of the polyester polyols, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide, e.g., ethylene oxide, propylene oxide, etc., and the glycidyl esters of versatic acid with methacrylic acid to form the corresponding ester.

Polyether polyols are generally known and can have a number average molecular weight in the range of from 500 to 10,000. Examples of polyether polyols include various polyoxyalkylene polyols, polyalkoxylated polyols having a number average molecular weight greater than 500, e.g., poly(oxytetramethylene)diols, and mixtures thereof. The polyoxyalkylene polyols can be prepared, according to well-known methods, by condensing alkylene oxide, or a mixture of alkylene oxides using acid or base catalyzed addition, with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, e.g., 1,2-butylene oxide, amylene oxide, aralkylene oxides, e.g., styrene oxide, and the halogenated alkylene oxides such as trichlorobutylene oxide and so forth. The more preferred alkylene oxides include butylene oxide, propylene oxide and ethylene oxide or a mixture thereof using random or stepwise oxyalkylation. Examples of such polyoxyalkylene polyols include polyoxyethylene, i.e., polyethylene glycol, polyoxypropylene, i.e., polypropylene glycol and polyoxybutylene, i.e., polybutylene glycol. The number average molecular weight of such polyoxyalkylene polyols used as the soft segment is equal to or greater than 600, more preferably, equal to or greater than 725, and most preferably, equal to or greater than 1000.

The polyether polyols also include the generally known poly(oxytetramethylene)diols prepared by the polymerization of tetrahydrofuran in the presence of Lewis acid catalysts such as boron trifluoride, tin (IV) chloride and sulfonyl chloride. The number average molecular weight of poly(oxytetramethylene)diols used as the soft segment ranges from 500 to 5000, preferably from 650 to 2900, more preferably from 1000 to 2000, and most preferably is 1000.

Polyalkoxylated polyols having a number average molecular weight greater than 500 may be represented by the following general formula I,

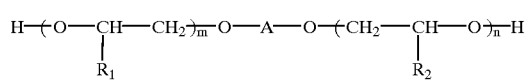

I wherein m and n are each a positive number, the sum of m and n being from 5 to 70, $R_1$ and $R_2$ are each hydrogen, methyl or ethyl, preferably hydrogen or methyl, and A is a divalent linking group selected from the group consisting of straight or branched chain alkylene (usually containing from 1 to 8 carbon atoms), phenylene, $C_1$–$C_9$ alkyl substituted phenylene and a group represented by the following general formula II,

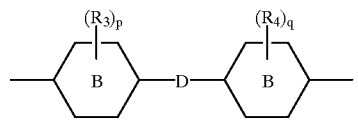

II wherein $R_3$ and $R_4$ are each $C_1$–$C_4$ alkyl, chlorine or bromine, p and q are each an integer from 0 to 4,

represents a divalent benzene group or a divalent cyclohexane group, and D is O, S, —S($O_2$)—, —C(O)—, 13 $CH_2$—, —CH═CH—, —C($CH_3$)$_2$—, —C($CH_3$)($C_6H_5$)— or

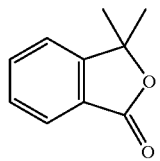

when

is the divalent benzene group, and D is O, S, —$CH_2$—, or —C($CH_3$)$_2$— when

is the divalent cyclohexane group. Preferably, the polyalkoxylated polyol is one wherein the sum of m and n is from 15 to 40, e.g., 25 to 35, $R_1$ and $R_2$ are each hydrogen, and A is a divalent linking group according to general formula II wherein

represents a divalent benzene group, p and q are each 0, and D is —C($CH_3$)$_2$—, and most preferably, the sum of m and n is from 25 to 35, e.g., 30. Such materials may be prepared by methods which are well known in the art. One such commonly used method involves reacting a polyol, e.g., 4,4'-isopropylidenediphenol, with an oxirane containing substance, for example ethylene oxide, propylene oxide, α-butylene oxide or β-butylene oxide, to form what is commonly referred to as an ethoxylated, propoxylated or butoxylated polyol having hydroxy functionality.

Examples of polyols suitable for use in preparing the polyalkoxylated polyols include the low molecular weight polyols described herein; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzenephenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidene-biscyclohexanol; 4,4'-oxybiscyclohexanol; 4,4'-thiobiscyclohexanol; and bis(4-hydroxycyclohexanol)methane.

Preferably, the polyether polyols are selected from the group consisting of polyoxyalkylene polyols, polyalkoxylated polyols, poly(oxytetramethylene)diols and mixtures thereof, and most preferably, polyoxyalkylene polyols having a number average molecular weight of equal to or greater than 1,000, ethoxylated Bisphenol A having approximately 30 ethoxy groups, poly(oxytetramethylene)diols having a number average molecular weight of 1000 and mixtures thereof.

Amide-containing polyols are generally known and typically are prepared from the reaction of diacids or lactones and low molecular weight polyols described herein with diamines or aminoalcohols as described hereinafter. For example, amide-containing polyols may be prepared by the reaction of neopentyl glycol, adipic acid and hexamethylenediamine. The amide-containing polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine and the like.

Polyhydric polyvinyl alcohols are generally known and can be prepared, for example, by the polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

Epoxy polyols are generally known and can be prepared, for example, by the reaction of glycidyl ethers of polyphenols, such as the diglycidyl ether of 2,2-bis(4-hydroxyphenyl)propane, with polyphenols, such as 2,2-bis(4-hydroxyphenyl)propane. Epoxy polyols of varying molecular weights and average hydroxyl functionality can be prepared depending upon the ratio of starting materials used.

Urethane polyols are generally known and can be prepared, for example, by reaction of a polyisocyanate with excess organic polyol to form a hydroxyl functional product. Examples of polyisocyanates useful in the preparation of urethane polyols include toluene-2,4-diisocyanate; toluene-2,6-diisocyanate; diphenylmethane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; dicyclohexylmethane diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; polymethylene polyphenol isocyanates perhydrodiphenylmethane-2,4'-diisocyanate; perhydrodiphenylmethane-4,4'-diisocyanate and mixtures thereof.

Examples of organic polyols useful in the preparation of urethane polyols include the polyols described herein with respect to polyacid curing agent, e.g., low molecular weight polyols, polyester polyols, polyether polyols, amide-containing polyols, polyacrylic polyols, polyhydric polyvinyl alcohols and mixtures thereof.

The polyacrylic polyols are generally known and can be prepared by free-radical addition polymerization techniques of monomers described hereinafter. Preferably said polyacrylic polyols have a weight average molecular weight of from 500 to 50,000 and a hydroxyl number of from 20 to 270. More preferably, the weight average molecular weight is from 1000 to 30,000 and the hydroxyl number is from 80 to 250. Most preferably, the average molecular weight is from 3,000 to 20,000 and the hydroxyl number is from 100 to 225.

Polyacrylic polyols include, but are not limited to, the known hydroxyl-functional addition polymers and copolymers of acrylic and methacrylic acids; their ester derivatives including, but not limited to, their hydroxyl-functional ester derivatives. Examples of hydroxy-functional ethylenically unsaturated monomers to be used in the preparation of the hydroxy-functional addition polymers include hydroxyethyl (meth)acrylate, i.e., hydroxyethyl acrylate and hydroxyethyl methacrylate, hydroxypropyl (meth)acrylate, hydroxybutyl (meth)acrylate, hydroxymethylethyl acrylate, hydroxymethylpropyl acrylate and mixtures thereof.

More preferably, the polyacrylic polyol is a copolymer of hydroxy-functional ethylenically unsaturated (meth)acrylic monomers and other ethylenically unsaturated monomers selected from the group consisting of vinyl aromatic monomers, e.g., styrene, $\alpha$-methyl styrene, t-butyl styrene and vinyl toluene; vinyl aliphatic monomers such as ethylene, propylene and 1,3-butadiene; (meth)acrylamide; (meth)acrylonitrile; vinyl and vinylidene halides, e.g., vinyl chloride and vinylidene chloride; vinyl esters, e.g., vinyl acetate; alkyl esters of acrylic and methacrylic acids, i.e. alkyl esters of (meth)acrylic acids, having from 1 to 17 carbon atoms in the alkyl group, including methyl (meth)acrylate, ethyl (meth)acrylate, butyl (meth)acrylate, cyclohexyl (meth)acrylate, 2-ethylhexyl (meth)acrylate, isobornyl (meth)acrylate and lauryl (meth)acrylate; epoxy-functional ethylenically unsaturated monomers such as glycidyl (meth)acrylate; carboxy-functional ethylenically unsaturated monomers such as acrylic and methacrylic acids and mixtures of such ethylenically unsaturated monomers.

The hydroxy-functional ethylenically unsaturated (meth)acrylic monomer(s) may comprise up to 95 weight percent of the polyacrylic polyol copolymer. Preferably it comprises up to 70 weight percent, and more preferably, the hydroxy-functional ethylenically unsaturated (meth)acrylic monomer(s) comprises up to 45 weight percent of the total copolymer.

The polyacrylic polyols described herein can be prepared by free radical initiated addition polymerization of the monomer(s), and by organic solution polymerization techniques. The monomers are typically dissolved in an organic solvent or mixture of solvents including ketones such as methyl ethyl ketones, esters such as butyl acetate, the acetate of propylene glycol, and hexyl acetate, alcohols such as ethanol and butanol, ethers such as propylene glycol mono-propyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 70 to 160° C., and the monomer or a mixture of monomers and free radical initiator is slowly added to the refluxing solvent, over a period of about 1 to 7 hours. Adding the monomers too quickly may cause poor conversion or a high and rapid exothermic reaction, which is a safety hazard. Suitable free radical initiators include t-amyl peroxyacetate, di-t-amyl peroxyacetate and 2,2'-azobis(2-methylbutanenitrile). The free radical initiator is typically present in the reaction mixture at from 1 to 10 percent, based on total weight of the monomers. The polymer prepared by the procedures described herein is non-gelled or ungelled and preferably has a weight average molecular weight of from 500 to 50,000 grams per mole.

Solvents will also be present in the coating composition of the present invention. As previously mentioned, solvents are typically used in such coating compositions. Suitable solvents are those that are necessary to dissolve the solid components of the coating composition. The minimum amount of solvent present in the coating composition is a solvating amount, i.e., an amount which is sufficient to solubilize the solid components in the coating composition. For example, the amount of solvent present may range from 10 to 80 weight percent based on the total weight of the coating composition. Suitable solvents include but are not limited to the following : benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N-(N-octyl)-pyrrolidinone, N-(n-dodecyl)pyrrolidinone, 2-methoxyethyl ether, xylene, cyclohexane, 3-methylcyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl foramide, ethylene glycol, mono- and dialkyl ethers of ethylene glycol and their derivatives sold as CELLOSOLVE industrial solvents by Union Carbide and mixtures thereof.

Photochromic compounds that may be utilized in the epoxy resin coating composition(s) of the present invention are organic photochromic compounds that may be used individually or in combination with other complementary photochromic compounds, i.e., organic photochromic compounds having at least one activated absorption maxima within the range of between about 400 and 700 nanometers, or substances containing same, that may be incorporated, e.g., dissolved or dispersed, in the epoxy resin composition used to prepare the coatings and which compounds or mixtures of compounds color when activated to an appropriate hue.

More particularly, the organic photochromic compounds comprise:

(a) at least one photochromic organic compound having a visible lambda max of from 400 nanometers to 525 nanometers; and (b) at least one photochromic organic compound having a visible lambda max of from greater than 525 nanometers to 700 nanometers.

Examples of suitable photochromic compounds for use in the epoxy resin composition of the present invention include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline) pyridobenzoxazines and indeno-fused naphthopyrans, such as those disclosed in U.S. Pat. No. 5,645,767. Specific examples include the novel naphthopyrans of U.S. Pat. No. 5,658,501 and the complementary organic photochromic substances disclosed in this patent from column 11, line 57 through column 13, line 36. Other photochromic substances contemplated for use herein are the photochromic metal-dithizonates, e.g., mercury dithizonates which are described in, for example, U.S. Pat. No. 3,361,706; and fulgides and fulgimides, e.g. the 3-furyl and 3-thienyl fulgides and fulgimides, which are described in U.S. Pat. No. 4,931,220 at column 20, line 5 through column 21, line 38 and mixtures of the aforementioned suitable photochromic substances.

The disclosures relating to such photochromic compounds in the aforedescribed patents are incorporated herein, in toto, by reference. The photochromic coatings of the present invention may contain one photochromic compound or a mixture of photochromic compounds, as desired. Mixtures of photochromic compounds may be used to attain certain activated colors such as a near neutral gray or brown. Further discussion of neutral colors and ways to describe such colors is found in U.S. Pat. No. 5,645,767, column 12, line 66 to column 13, line 19.

The amount of the photochromic substances described herein to be used in the coating of the present invention is an amount sufficient to produce a photochromic effect discernible to the naked eye upon activation. Generally such amount can be described as a photochromic amount.

The relative amounts of the aforesaid photochromic compounds used will vary and depend in part upon the relative intensities of the color of the activated species of such compounds, and the ultimate color desired. Generally, the amount of photochromic substance incorporated into the coating composition may range from 0.1 to 40 weight percent, based on the weight of the solids in the coating composition. Preferably, the concentration of photochromic substances ranges from 1.0 to 30 weight percent, more preferably, from 3 to 20 weight percent, and most preferably, from 5 to 15 weight percent, e.g., from 7 to 14 weight percent.

The photochromic compound(s) described herein may be incorporated into the coating composition by dissolving or dispersing the photochromic substance within the organic polyol used to prepare the polyacid curing agent and/or the polyepoxide; by adding it to a mixture of the epoxy resin-forming coating composition; and/or by dissolving it in solvent before adding it to the organic polyol or coating composition. Alternatively, the photochromic compounds may be incorporated into the cured coating by imbibition, permeation or other transfer methods as is known by those skilled in the art.

Compatible (chemically and color-wise) tints, i.e., dyes, may be added to the coating composition, applied to coated article or applied to the substrate prior to coating to achieve a more aesthetic result, for medical reasons, or for reasons of fashion. The particular dye selected will vary and depend on the aforesaid need and result to be achieved. In one embodiment, the dye may be selected to complement the color resulting from the activated photochromic substances, e.g., to achieve a more neutral color or absorb a particular wavelength of incident light. In another embodiment, the dye may be selected to provide a desired hue to the substrate and/or coated article when the photochromic substances is in an unactivated state.

Adjuvant materials may also be incorporated into the coating composition with the photochromic substances, prior to, simultaneously with or subsequent to application or incorporation of the photochromic substances in the coating composition or cured coating. For example, ultraviolet light absorbers may be admixed with photochromic substances before their addition to the coating composition or such absorbers may be superposed, e.g., superimposed, as a layer between the photochromic coating and the incident light. Further, stabilizers may be admixed with the photochromic substances prior to their addition to the coating composition to improve the light fatigue resistance of the photochromic substances. Stabilizers, such as hindered amine light stabilizers (HALS), antioxidants, e.g., polyphenolic antioxidants, asymmetric diaryloxalamide (oxanilide) compounds and singlet oxygen quenchers, e.g., a nickel ion complex with an organic ligand, or mixtures of stabilizers are cortemplated. They may be used alone or in combination. Such stabilizers are described in U.S. Pat. Nos. 4,720,356, 5,391,327 and 5,770,115, which patents are incorporated herein by reference.

The photochromic epoxy resin coating composition of the present invention may further comprise additional conventional ingredients which impart desired characteristics to the composition, or which are required for the process used to apply and cure the composition to the substrate or which enhance the cured coating male therefrom. Such additional ingredients comprise rheology control agents, plasticizers, leveling agents, e.g, surfactants, initiators, cure-inhibiting agents, free radical scavengers and adhesion promoting agents, such as trialkoxysilanes preferably having an alkoxy radical of 1 to 4 carbon atoms, including γ-glycidoxypropyltrimethoxysilane, γ-aminopropyltrimethoxysilane, 3,4-epoxycyclohexylethyltrimethoxysilane and aminoethyltrimethoxysilane.

The coating compositions of the present invention may be applied to substrates of any type such as, for example paper, glass, ceramics, wood, masonary, textiles, metals and polymeric organic materials. Preferably, the substrate is a polymeric organic material, particularly, thermoset and thermoplastic polymeric organic materials, e.g., thermoplastic polycarbonate type polymers and copolymers, and homopolymers or copolymers of a polyol(allyl carbonate) used as organic optical materials.

The amount, i.e., thickness, of the coating composition applied to the substrate is an amount which incorporates a sufficient quantity of organic photochromic compound(s) to produce a coating that exhibits the required change in optical density ($\Delta OD$) when the cured coating is exposed to UV radiation. The required change in optical density is that which, when tested at 72° F. (22° C.), produces a $\Delta OD$ of at least 0.15 after 30 seconds and at least 0.50 after 15 minutes. The bleach rate of the photochromic coating (the photochromic(s) in the coating) should be less than 200 seconds using the photochromic response testing described in Part C of Example 9 herein. The applied coating may have a thickness of from 5 to 200 microns. Preferably, the coating thickness is from 5 to 100 microns, more preferably, from 10 to 40 microns, e.g., 25 microns, and most preferably from 10 to 25 microns, e.g., 20 microns.

It is typical to treat the surface of the substrate to be coated prior to applying the coating composition of the present invention for the purposes of cleaning the surface and promoting adhesion. Effective treatment techniques for plastics, such as those prepared from CR-39® diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol: water or ethanol: water; UV treatment; Activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

In some cases, it may be necessary to apply a primer to the surface of the substrate before application of the coating composition of the present invention. The primer serves as a barrier coating to prevent interaction of the coating ingredients with the substrate and vice versa, and/or as an adhesive layer to adhere the coating composition to the substrate. Application of the primer may be by any of the methods used in coating technology such as, for example, spray coating, spin coating, spread coating, curtain coating, dip coating, casting or roll-coating.

The use of protective coatings, some of which may contain polymer-forming organosilanes, as primers to improve adhesion of subsequently applied coatings has been described. In particular, the use of non-tintable coatings is preferred. Examples of commercial coating products include SILVUE 124 and HI-GARD coatings, available from SDC Coatings, Inc. and PPG Industries, Inc., respectively. In addition, depending on the intended use of the coated article, it may be necessary to apply an appropriate protective coating(s), i.e., an abrasion resistant coating onto the exposed surface of the coating composition to prevent scratches from the effects of friction and abrasion. In some cases, the primer and protective coatings are interchangeable, i.e., the same coating may be used as the primer and the protective coating(s). Other coatings or surface treatments, e.g., a tintable coating, antireflective surface, etc., may also be applied to the cured coating of the present invention.

The coating composition of the present invention may be applied using the same methods described herein for applying the primer and the protective coating(s) or other methods known in the art can be used. Preferably, the coating composition is applied by spin coaling, curtain coating, dip coating or spray coating methods, and most preferably, by spin coating methods.

Following application of the coating composition to the treated surface of the substrate, the coating is cured. Depending on the components selected for the coating composition of the present invention, the coating may be cured at temperatures ranging from 22° C. to 200° C. If heating is required to obtain a cured coating, temperatures of between 80° C. and a temperature above which the substrate is damaged due to heating, e.g., 80° C. to 150° C., are typically used. For example, certain organic polymeric materials may be heated up to 130° C. for a period of 1 to 16 hours in order to cure the coating without causing damage to the substrate. While a range of temperatures has been described for curing the coated substrate, it will be recognized by persons skilled in the art that temperatures other than those disclosed herein may be used. Additional methods for curing the photochromic epoxy resin coating composition include irradiating the coating with infrared, ultraviolet, gamma or electron radiation so as to initiate the polymerization reaction of the polymerizable components in the coating. This may be followed by a heating step.

Preferably, the resulting cured coating meets commercially acceptable "cosmetic" standards for optical coatings. Examples of cosmetic defects of coated lens include its, spots, inclusions, cracks and crazing of the coating, cost preferably, the coatings prepared using the photochromic epoxy resin coating composition of the present invention are substantially free of cosmetic defects.

Examples of polymeric organic materials that may be substrates for the coating composition of the present invention are polymers, i.e., homopolymers and copolymers, of the monomers and mixtures of monomers disclosed in U.S. Pat. No. 5,658,501 from column 15, line 28 to column 16, line 17, which is incorporated herein by reference.

Examples of such monomers and polymers include: polyol(allyl carbonate)monomers, e g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismetharylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof.

More particularly contemplated, is the use of the combination of the photochromic epoxy resin coating composition of the present invention with polymeric organic materials such as optically clear polymerizes, i.e., materials suitable for optical applications, such as optical elements, e.g., piano and vision correcting ophthalmic lenses, windows, clear polymeric films, automotive transparencies, e.g., windshields, aircraft transparencies, plastic sheeting, etc. Such optically clear polymerizates may have a refractive index that may range from about 1.48 to about 1.75, e.g., from about 1.495 to about 1.66. Application of the photochromic epoxy resin coating composition of the present invention to a polymeric film in the form of an "applique" may be accomplished using the methods describe in column 17, line 28 to column 18, line 57 of U.S. Pat. No. 5,198,267.

Most particularly contemplated, is the use of the combination of the photochromic Epoxy resin coating composition of the present invention with optical elements to produce photochromic optical articles. Such articles are prepared preferably by sequentially applying to the optical element a primer, the photochromic epoxy resin composition of the present invention and an appropriate protective coating(s). The resulting cured coating preferably meets commercially acceptable "cosmetic" standards for optical coatings, and most preferably, is substantially free of cosmetic defects.

The present invention is more particularly described in the following examples, which are intended as illustrative only, since numerous modificatiols and variations therein will be apparent to those skilled in the art.

COMPOSITION A

The following materials were added in the order and manner described to a suitable reaction vessel equipped with an agitator, a reflux column, an addition funnel, nitrogen inlet, an internal temperature probes connected to an external electronic controller and a heating mantle:

| Material | Weight (grams) |
|---|---|
| Charge-1 | |
| QO POLYMEG 1000 polyol[1] | 400.6 |
| Butyl acetate | 183.4 |
| Charge-2 | |
| Hexahydrophthalic anhydride | 120.5 |
| Butyl acetate | 39.9 |

[1]Poly(oxytetramethylene)diol having a number average molecular weight of 1000 which is available from Great Lakes Chemical Corporation.

Charge-1 was added to the reaction vessel, nitrogen was introduced into the vessel, and with the agitator running heat was applied to the reaction vessel to maintain a temperature of about 115° C. After reaching the required temperature, Charge-2 was added to the reaction vessel in a continuous manner over a period of 1 hour. Subsequently, the reaction mixture was held an additional 4 hours at 115° C. The contents of the reaction vessel were then cooled and transferred to a suitable container. The resulting polymer solution had a total solids content, measured for one hour at 110° C., of about 71.1 percent. The polymer had a weight average molecular weight, as measured by gel permeation chromatography using polystyrene as a standard, of about 2907.

COMPOSITION B

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
|---|---|
| Charge-1 | |
| Xylene | 340.1 |
| Charge-2 | |
| Glycidyl methacrylate | 720.0 |
| Cyclohexyl methacrylate | 360.0 |
| Butyl acrylate | 120.0 |
| Charge-3 | |
| LUPERSOL 555 M60[2] | 40.0 |
| Xylene | 100.0 |
| Charge-4 | |
| Di-t-amyl peroxide | 12.0 |
| Xylene | 12.0 |

[2]t-Amyl peroxyacetate, 60 weight percent in mineral spirits, available from Elf Atochem.

Charge-1 was added to the reaction vessel, nitrogen was introduced into the vessel; and with the agitator running heat was applied to the reaction vessel to maintain a temperature at which reflux of the solvent occurred. After reaching the reflux temperature, Charges-2 and -3 were added separately to the reaction vessel in a continuous manner. The addition of Charge-3 was started 5 minutes before the addition of Charge-2 and continued over a period of 3.5 hours. Charge-2 was added to the reaction vessel in a continuous manner over a period of 3 hours. After each addition of Charges-2 and -3, a rinse of 10 grams of xylene was added to the addition funnel. When the additions were completed, the reaction mixture was held for 30 minutes at the reflux temperature. Charge-4 was then added in a continuous manner over a period of 30 minutes followed by a xylene (5.0 grams) rinse. The reaction mixture was held an additional 2 hours at the reflux temperature. The contents of the reaction vessel were cooled and transferred to a suitable container. The resulting polymer solution had a total solics content, measured for one hour at 110° C., of about 71.6 percent. The polymer had a weight average molecular weight, as measured by gel chromatography using polystyrene as a standard, of about 7652.

COMPOSITION C

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
|---|---|
| Charge-1 | |
| Xylene | 340.1 |
| Charge-2 | |
| Glycidyl methacrylate | 720.0 |
| Isobornyl methacrylate | 360.0 |
| Butyl acrylate | 120.0 |
| Charge-3 | |
| LUPERSOL 555 M60 | 40.0 |
| Xylene | 100.0 |
| Charge-4 | |
| Di-t-amyl peroxide | 12.0 |
| Xylene | 12.0 |

Charge-1 was added to the reaction vessel, nitrogen was introduced into the vessel; and with the agitator running heat was applied to the reaction vessel to maintain a temperature at which reflux of the solvent occurred. After reaching the reflux temperature, Charges-2 and -3 were added separately to the reaction vessel in a continuous manner. The addition of Charge-3 was started 5 minutes before the addition of Charge-2 and continued over a period of 3.5 hours. Charge-2 was added to the reaction vessel in a continuous manner over a period of 3 hours. After each addition of Charges-2 and -3, a rinse of 10 grams of xylene was added to the addition funnel. When the additions were completed the reaction mixture was held for 30 minutes at the reflux temperature. Charge-4 was then added in a contiguous manner over a period of 30 minutes followed by a xylene (5.02 grams) rinse. The reaction mixture was held an additional 2 hours at the reflux temperature. The contents of the reaction vessel were cooled and transferred to a suitable container. The resulting polymer solution had a total solids content, measured for one hour at 110° C., of about 71.2 percent. The polymer had a weight average molecular weight, as measured by gel chromatography using polystyrene as a standard, of about 6591.

COMPOSITION D

The procedure for preparing Composition B was followed except that 120.0 grams of the LUPERSOL 555 M60 was used instead of 40.0 grams. The resulting polymer solution had a total solids content, measured for one hour at 110° C., of about 71.7 percent. The polymer had a weight average molecular weight, as measured by gel chromatography using polystyrene as a standard, of abolt 3599.

COMPOSITION E

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
|---|---|
| Charge-1 | |
| Xylene | 393.9 |
| Charge-2 | |
| Glycidyl methacrylate | 428.0 |
| Cyclohexyl methacrylate | 428.0 |
| Charge-3 | |
| LUPERSOL 555 M60 | 41.7 |
| Xylene | 208.3 |
| Charge-4 | |
| Glycidyl methacrylate | 72.0 |
| Methyl methacrylate | 2.00 |
| Butyl methacrylate | 70.0 |
| Charge-5 | |
| Di-t-amyl peroxide | 10.0 |
| Xylene | 10.0 |

Charge-1 was added to he reaction vessel, nitrogen was introduced into the vessel; and with the agitator running heat was applied to the reaction Bessel to maintain a temperature at which reflux of the solvent occurred. After reaching the reflux temperature, Charges-2 and -3 were added separately to the reaction vessel in a continuous manner. The addition of Charge-3 was started 5 minutes before the addition of Charge-2 and continued over a period of 4 hours. Charge-2 was added to the reaction vessel in a continuous manner over a period of 2.5 hours. Thirty minutes after completing the addition of Charge-2, the addition of Charge-4 was started and continued over a period of 30 minutes. After each addition of Charges-2, -3 and -4, a rinse of 5 grams of xylene was added to the addition funnel. When the additions were completed the reaction mixture was held for 30 minutes at the reflux temperature. Charge-5 was then added in a continuous manner over a period of 30 minutes followed by a xylene (5.0 grams) rinse. The reaction mixture was held an additional 2 hours at the reflux temperature. The contents of the reaction vessel were cooled and transferred to a suitable container. The resulting polymer solution had a total solids content, measured for one hour at 110° C., of about 62.1 percent.

COMPOSITION F

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
|---|---|
| Charge-1 | |
| Pentaerythritol | 136.16 |
| n-Amyl propionate | 177.17 |
| Charge-2 | |
| Methylhexahydrophthalic anhydride | 659.3 |
| n-Amyl propionate | 10.0 |
| Charge-3 | |
| n-Propyl alcohol | 187.17 |

Charge-1 was added to the reaction vessel, nitrogen was introduced into the vessel; and with the agitator running heat was applied to the reaction vessel to maintain a temperature of 125° C. After reaching the required temperature, Charge-2 was added to the reaction vessel in a continuous manner over a period of 1–2 hours. The reaction mixture was cooled to 115° C. and maintained at 115° C. for 4 hours. Charge-3 was then added to the reaction vessel. When the addition of Charge 3 was completed, the reaction mixture was held for 30 minutes at 105° C., the reflux temperature. The contents of the reaction vessel were cooled and transferred to a suitable container. The resulting polymer solution had a theoretical total solids content of about 68.0 percent.

COMPOSITION G

The amounts listed below, of Composition A and Composition F necessary to yield the listed weight ratio of Composition A to Composition F, were added to a beaker containing a magnetic stir bar. The resulting mixture was stirred for about 15 minutes on a THERMOLYNE Type 1000 magnetic stirrer set at high speed.

| Composition No. | Ratio of Composition A:F | Amount of Composition A (grams) | Amount of Composition F (grams) |
| --- | --- | --- | --- |
| G1 | 13:87 | 4.4 | 9.7 |
| G2 | 15:85 | 24.6 | 45.9 |
| G3 | 16:84 | 5.2 | 8.9 |
| G4 | 18:82 | 5.6 | 8.4 |
| G5 | 19:81 | 5.9 | 8.2 |
| G6 | 21:79 | 7.3 | 8.8 |
| G7 | 22:78 | 6.5 | 7.6 |
| G8 | 23:77 | 6.7 | 7.4 |

COMPOSITION H

Sixteen grams of a photochromic naphtho[1,2-b]pyran that exhibits a blue color when irradiated with ultraviolet light was added to a beaker containing 20 grams of n-methyl pyrrolidone and a magnetic stirrer. The resulting mixture was stirred for about 60 minutes on a THERMOLYNE Type 1000 magnetic stirrer set at high speed.

EXAMPLE 1

The following materials were added to a beaker containing a magnetic stir bar and stirred for 15 minutes: 6.7 grams of Composition G1, 7.7 grams of Composition D, 1.8 grams of Composition H and 1.5 grams of N-methylpyrrolidone (NMP).

EXAMPLE 2

The procedure of Example 1 was followed except that 6.3 grams of Composition G2 was used in place of 6.7 grams of Composition G1 and Composition B was used in place of Composition D.

EXAMPLE 3

The procedure of Example 1 was followed except that 6.9 grams of Composition G3 was used in place of 6.7 grams of Composition G1 and Composition C was used in place of Composition D.

EXAMPLE 4

The procedure of Example 1 was followed except that 7.0 grams of Composition G4 was used in place of 6.7 grams of Composition G1, 8.7 grams of Composition E was used in place of 7.7 grams of Composition D and 1.0 gram of NMP was used instead of 1.5 grams.

EXAMPLE 5

The procedure of Example 1 was followed except that 7.1 grams of Composition G5 was used in place of 6.7 grams of Composition G1 and 7.4 grams of Composition D was used in place of 7.7 grams.

EXAMPLE 6

The procedure of Example 1 was followed except that 7.1 grams of Composition G6 was used in place of 6.7 grams of Composition G1, 7.4 grams of Composition B was used in place of 7.7 grams of Composition D and 2.0 grams of NMP was used instead of 1.5 grams.

EXAMPLE 7

The procedure of Example 1 was followed except that 7.2 grams of Composition G7 was used in place of 6.7 grams of Composition G1 and 7.4 grams of Composition C was used in place of 7.7 grams of Composition D.

EXAMPLE 8

The procedure of Example 1 was followed except that 6.7 grams of Composition G8 was used in place of Composition G1, 8.4 grams of Composition E was used in place of 7.7 grams of Composition D and 1.0 gram of N.P was used instead of 1.5 grams.

EXAMPLE 9

Part A

The solutions prepared in Examples 1–8 were applied via a spincoating method to test sample polymerizates made of CR-39® monomer. The test samples measured ¼ inch (0.6 centimeter)×2 inches (5.1 centimeters)×2 inches (5.1 centimeters). Prior to application of the coating, each test sample was washed with detergent, rinsed with water, immersed for 20 minutes in an aqueous 40 weight percent sodium hydroxide solution, which was maintained at 23–25° C., and then again washed with detergent and used with water. The solutions were dispensed onto each test sample which was spinning at 1500 rpm. The test samples for Examples 3 and 5 were spun for 5 seconds and all of the others were spun for 9 seconds. The test samples coated with the solution of Example 3 were cured for 50 minutes in a convection oven maintained at 140° C., the test samples coated with Example 8 were cured for 30 minutes and all of the others were cured for 45 minutes at 140° C. The final thickness of each of the dried coatings was approximately 20 microns.

Part B

The photochromic coated test samples prepared in Part A were subjected to microhardness ($F_h$) testing using a Fischerscope HCU, Model H-100 available from Fischer Technology, Inc. The microhardness, measured in Newtons (N) per $mm^2$, of the coated test samples was determined by taking 1 measurement at a depth of 2 microns in the center area of the test sample prepared for each Example under the conditions of a 100 milliNewton load, 30 load steps and 0.5 second pauses between load steps. The test results are listed in Table 1.

Part C

The photochromic coated test samples prepared in Part A were tested for photochromic response on an optical bench.

Prior to testing on the optical bench, the photochromic test samples were exposed to 365 nanometer ultraviolet light for about 20 minutes to activate the photochromic compounds and then placed in a 75° C. oven for about 20 minutes to bleach (inactivate) the photochromic compounds. The coated test samples were then cooled to room temperature, exposed to fluorescent room lighting for at least 2 hours and then kept covered for at least 2 hours prior to testing on an optical bench. The bench was fitted with a 300 watt Xenon arc lamp, a remote controlled shutter, a Schott 3 mm KG-2 band-pass filter, which removes short wavelength radiation, neutral density filter(s), a water cell sample holder having quartz windows for maintaining sample temperature in which the test sample to be tested was inserted.

The power output of the optical bench, i.e., the dosage of light that the sample test sample would be exposed to, was adjusted to 0.67 milliwatts per square centimeter ($mW/cm^2$) using a GRASEBY Optronics Model S-371 portable photometer (Serial #21536) with a JV-A detector (Serial # 22411). The UV-A detector was placed into the sample holder and the light output was measured. Adjustments to the power output were made by increasing or decreasing the lamp wattage or by adding or removing neutral density filters in the light path.

A monitoring, collimated beam of light from a tungsten lamp was passed through the sample at 30° normal to the surface of the lens. After passing through the lens, the light from the tungsten lamp was directed through a 570 nanometer (nm) filter attached to a detector. The 570 nm filter passes wavelengths characteristic of the photochromic compound used in the Examples. The output signals from the detector were processed by a radiometer. The control of the test conditions and acquisition of data was handled by the Labtech Notebook Pro software and the recommended I/O board.

Change in optical density ($\Delta OD$) from the bleached state to the darkened state was determined by establishing the initial transmittance, opening the shutter from the Xenon lamp to provide ultraviolet radiation to change the test sample from the bleached state to an activated (i.e., darkened) state at selected intervals of time, measuring the transmittance in the activated state, and calculating the change in optical density according to the formula: $\Delta OD = \log(\%Tb/\%Ta)$, where %Tb is the percent transmittance in the bleached state, %Ta is the percent transmittance in the activated state and the logarithm is to the base 10.

The $\Delta OD$ was measured using a 570 nanometer filter after the first thirty (30) seconds of UV exposure and then after fifteen (15) minutes with the optical bench maintained at a temperature of 72° F. (22° C.). The Bleach Rate (T ½) is the time interval in seconds for the $\Delta OD$ of the activated form of the photochromic compound in the coated test samples to reach one half the highest $\Delta OD$ at (72° F., 22° C.) after removal of the source of activating light. Results for the photochromic coated test samples for each Example are listed in Table 2.

TABLE 1

| Example No. | $F_h$ (N per $mm^2$) |
|---|---|
| 1 | 127 |
| 2 | 122 |
| 3 | 125 |
| 4 | 113 |
| 5 | 84 |

TABLE 1-continued

| Example No. | $F_h$ (N per $mm^2$) |
|---|---|
| 6 | 92 |
| 7 | 96 |
| 8 | 88 |

TABLE 2

| Example No. | 72° F. $\Delta OD$ @ 30 seconds | 72° F. $\Delta OD$ @ 15 minutes | 72° F. T 1/2 (seconds) |
|---|---|---|---|
| 1 | 0.18 | 0.64 | 178 |
| 2 | 0.21 | 0.66 | 142 |
| 3 | 0.21 | 0.63 | 137 |
| 4 | 0.23 | 0.66 | 118 |
| 5 | 0.30 | 0.71 | 82 |
| 6 | 0.29 | 0.69 | 76 |
| 7 | 0.31 | 0.69 | 70 |
| 8 | 0.30 | 0.70 | 78 |

The results of Tables 1 and 2 show that the photochromic coated test samples prepared using the solutions of Examples 1 through 8 had microhardness results ranging from 84 to 127 N per $mm^2$, demonstrated a $\Delta OD$ of at least 0.15 after 30 seconds and at least 0.5 after 15 minutes and had a fade rate of less than 200 seconds, all tested at 72° F. (22° C.).

Although the present invention has been described with reference to the specific details of particular embodiments thereof, it is not intended that such details be regarded as limitations upon the scope of the invention except as and to the extent that they are included in the accompanying claims.

We claim:

1. An article comprising, in combination, a substrate and a photochromic polyacid cured epoxy resin coating on at least one surface of said substrate, said photochromic epoxy resin coating having a Fischer microhardness of from 50 to 150 Newtons per $mm^2$, a 72° F. $\Delta OD$ of at least 0.15 after 30 seconds and at least 0.50 after 15 minutes, and a bleach rate of less than 200 seconds.

2. The article of claim 1 wherein the Fischer microhardness of said coating is from 80 to 130 Newtons per $mm^2$, the $\Delta OD$ is at least 0.18 after 30 seconds and at least 0.63 after 15 minutes, and the bleach rate is less than 180 seconds.

3. The article of claim 1 wherein the photochromic epoxy resin coating is prepared from components comprising:
    (a) epoxy resin;
    (b) polyacid curing agent; and
    (c) a photochromic amount of at least one photochromic compound; wherein the equivalent weight ratio of (a) to (b) ranges from 0.3:1 to 3.0:1.0.

4. The article of claim 3 wherein the photochromic epoxy resin coating further comprises a catalytic amount of basic catalyst to accelerate the reaction of the epoxy resin and curing agent.

5. The article of claim 4 wherein the catalyst is pyridine, piperidine, dimethylaniline, diethylenetriamine, tetramethylammonium chloride, tetramethylammonium acetate, tetramethylbenzylammonium acetate, tetrabutylammonium fluoride, tetrabutylammonium bromide or mixtures of said catalysts.

6. The article of claim 3 wherein the epoxy resin is an epoxy-containing acrylic polymer, epoxy condensation polymer, polyepoxide monomer, polyepoxide oligomer or a mixture selected from said monomers, polymers and oligomers.

7. The article of claim 6 wherein the epoxy resin is an epoxy-containing acrylic polymer.

8. The article of claim 7 wherein the epoxy-containing acrylic polymer is a co-polymer of (a) at least one ethylenically unsaturated monomer having at least one epoxy group and (b) at least one polymerizable ethylenically unsaturated monomer which is free of epoxy groups.

9. The article of claim 8 wherein the amount of the ethylenically unsaturated monomer(s) having at least one epoxy group ranges from 30 to 80 weight percent and the amount of the ethylenically unsaturated monomer(s) which is free of epoxy groups ranges from 20 to 70 weight percent, based on the total weight of the polymerizable composition.

10. The article of claim 8 wherein the ethylenically unsaturated monomer having at least one epoxy group is glycidyl acrylate, glycidyl methacrylate, 3,4-epoxycyclohexylmethyl(meth)acrylate; 2-(3,4-epoxycyclohexyl)ethyl(meth)acrylate, allyl glycidyl ether or mixtures thereof.

11. The article of claim 8 wherein the polymerizable ethylenically unsaturated monomer free of epoxy groups is vinyl aromatic monomers, vinyl aliphatic monomers, acrylonitrile, methacrylonitrile, alkyl esters of (meth)acrylic acids, hydroxy-functional monomers, or mixtures of such ethylenically unsaturated monomers.

12. The article of claim 3 wherein the curing agent component is a polyacid of the following structure:

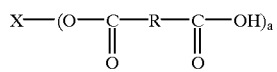

wherein X is a residue of an organic polyol after the polyol has been reacted with two or more 1,2-dicarboxylic acid anhydrides, R is an organic moiety associated with the anhydride and a is equal to or greater than 2.

13. The article of claim 12 wherein the 1,2-dicarboxylic acid anhydride is succinic anhydride, methylsuccinic anhydride, dodecenylsuccinic anhydride, glutaric anhydride, octadecenylsuccinic anhydride, phthalic anhydride, tetrahydrophthalic anhydride, methyltetrahydrophthalic anhydride, hexahydrophthalic anhydride, methylhexahydrophthalic anhydride, tetrachlorophthalic anhydride, endomethylene tetrahydrophthalic anhydride, chlorendic anhydride, itaconic anhydride, citraconic anhydride, maleic anhydride or a mixture of said anhydrides.

14. The article of claim 12 wherein the organic polyol is a low molecular weight polyol, polyester polyol, polyether polyol, amide-containing polyol, polyacrylic polyol, epoxy polyol, polyhydric polyvinyl alcohol, urethane polyol or mixtures of such polyols.

15. The article of claim 14 wherein the organic polyol is a low molecular weight polyol, polyether polyol or mixtures thereof.

16. The article of claim 15 wherein the organic polyol is tetramethylolmethane; trimethylolethane; trimethylolpropane; di-(trimethylolpropane); polyoxyalkylene polyols having a number average molecular weight of equal to or greater than 1,000, ethoxylated bisphenol A having approximately 30 ethoxy groups, poly(oxytetramethylene)diol having a number average molecular weight of 1000 or mixtures thereof.

17. The article of claim 3 wherein the photochromic compound component comprises:

(a) at least one photochromic compound having a visible lambda max of from 400 nanometers to 525 nanometers; and (b) at least one photochromic compound having a visible lambda max of from greater than 525 nanometers to 700 nanometers.

18. The article of claim 3 wherein the photochromic compound component is a benzopyran, naphthopyran, phenanthropyran, quinopyran, indeno-fused naphthopyran, benzoxazine, naphthoxazine, spiro(indoline) pyridobenzoxazine, metal-dithizonate, fulgide, fulgimide or mixtures thereof.

19. The article of claim 1 wherein a primer layer is interposed between the substrate and the photochromic epoxy resin coating.

20. The article of claim 19 wherein the primer is a non-tintable hardcoat.

21. The article of claim 1 wherein the photochromic epoxy resin coating has a thickness of from 5 to 200 microns.

22. The article of claim 21 wherein the photochromic epoxy resin coating has a thickness of from 10 to 40 microns.

23. The article of claim 1 wherein said substrate is paper, glass, ceramic, wood, masonry, textile, metal or polymeric organic materials.

24. The article of claim 23 wherein the polymeric organic material is a solid transparent polymer selected from the group consisting of poly(methyl methacrylate), poly (ethylene glycol bismethacrylate), poly(ethoxylated bisphenol A dimethacrylate), thermoplastic polycarbonate, poly (vinyl acetate), polyvinylbutyral, polyurethane, polythiourethanes, and polymers of members of the group consisting of diethylene glycol bis(allyl carbonate) monomers, diethylene glycol dimethacrylate monomers, ethoxylated phenol methacrylate monomers, diisopropenyl benzene monomers, ethoxylated trimethylol propane triacrylate monomers and mixtures thereof.

25. The article of claim 24 wherein said substrate is an optical element.

26. The article of claim 25 wherein said optical element is a lens.

27. The article of claim 26 wherein the refractive index of said lens is from 1.48 to 1.75.

* * * * *